(12) United States Patent
Gras

(10) Patent No.: US 9,195,749 B2
(45) Date of Patent: Nov. 24, 2015

(54) CONSTRUCTION OF BOOLEAN SEARCH STRINGS FOR SEMANTIC SEARCH

(71) Applicant: Seaton Gras, Seattle, WA (US)

(72) Inventor: Seaton Gras, Seattle, WA (US)

( * ) Notice: Subject to any disclaimer, the term of this patent is extended or adjusted under 35 U.S.C. 154(b) by 0 days.

(21) Appl. No.: 14/251,375

(22) Filed: Apr. 11, 2014

(65) Prior Publication Data

US 2014/0222774 A1 Aug. 7, 2014

Related U.S. Application Data

(63) Continuation of application No. 12/873,167, filed on Aug. 31, 2010, now abandoned.

(60) Provisional application No. 61/238,679, filed on Aug. 31, 2009.

(51) Int. Cl.
*G06F 17/30* (2006.01)

(52) U.S. Cl.
CPC .... *G06F 17/30864* (2013.01); *G06F 17/30528* (2013.01); *G06F 17/30882* (2013.01)

(58) Field of Classification Search
CPC ............... G06F 17/30014; G06F 17/30528; G06F 17/30864; G06F 17/30855; G06F 17/30882
USPC .......... 707/706, 740, 737; 704/9, 10
See application file for complete search history.

(56) References Cited

U.S. PATENT DOCUMENTS

| | | | |
|---|---|---|---|
| 6,405,190 B1 * | 6/2002 | Conklin | 1/1 |
| 2002/0093678 A1 * | 7/2002 | Skidgel et al. | 358/1.15 |
| 2002/0133481 A1 * | 9/2002 | Smith et al. | 707/3 |
| 2005/0267871 A1 * | 12/2005 | Marchisio et al. | 707/3 |
| 2006/0184516 A1 * | 8/2006 | Ellis | 707/3 |
| 2006/0271353 A1 * | 11/2006 | Berkan et al. | 704/9 |
| 2007/0050393 A1 * | 3/2007 | Vogel et al. | 707/102 |
| 2007/0106499 A1 * | 5/2007 | Dahlgren et al. | 704/10 |
| 2008/0133585 A1 * | 6/2008 | Vogel et al. | 707/102 |
| 2009/0164441 A1 * | 6/2009 | Cheyer | 707/4 |
| 2009/0287669 A1 * | 11/2009 | Bennett | 707/4 |

* cited by examiner

*Primary Examiner* — Jean M Corrielus
(74) *Attorney, Agent, or Firm* — Boswell IP Law; J. Mason Boswell

(57) ABSTRACT

A system for information retrieval accessing any number of search engines over a distributed network or local network is presented. The system includes one or more pre-built ontologies or lexicons, representing areas of knowledge. The system includes a settings panel where searchers can preset default languages, default ontologies, and target search engines. The system includes an application that receives a variety of searcher input from a user interface such as a spinning wheel, or from a scrolling list. Through such selections, the application subsequently builds a Boolean search engine string of terms. The Boolean search string is then passed to the target search engine for retrieving semantically accurate search results. The Boolean search string provides a tight range on the search parameters and thereby delivers higher quality results that are more precise.

20 Claims, 4 Drawing Sheets

CONSTRUCTION OF BOOLEAN SEARCH STRINGS FOR SEMANTIC SEARCH

CROSS-REFERENCE TO RELATED APPLICATIONS

This application is a continuation of U.S. patent application Ser. No. 12/873,167, entitled "CONSTRUCTION OF BOOLEAN SEARCH STRINGS FOR SEMANTIC SEARCH," and filed on Aug. 31, 2010, which claims the benefit of U.S. Provisional Application No. 61/238,679, entitled "SEMANTIC SEARCH SYSTEM," and filed on Aug. 31, 2009, each of which is hereby incorporated by reference.

BACKGROUND

Search has become a common way of finding information stored on the Internet, on a user's computer system, or on other storage resources (e.g., databases, file systems, and so forth). A common user interface for search tools includes a text control in which a user enters a search query string (e.g., "strawberry festival") and a button for initiating the search. The search tool then uses a previously created index (e.g., created by crawling the web or indexing files on the user's computer system) to match terms or phrases in the query string with words stored in the index. More advanced search tools may map text in the user's query string to other text, such as other forms of words (e.g., "running" vs. "ran") and synonyms (e.g., "stocks" vs. "equities"), and identify documents or text that match in the index. The search tools then provide the user with a matching list of search results, which may include documents, links to web pages, or other data sources with contents that match the query string in some way.

Most search engines receive user input in the form of keystrokes. This assumes a degree of knowledge and typing skills. For novice computer searchers, the lack of keyboarding skills will make searching more difficult and, at times, more frustrating. In addition, individuals with physical or mental difficulties may find keyboarding even more difficult. Lastly, individuals with limited vocabulary also will face great difficulties in making successful searches. With modern search tools, you simply cannot search for something if you do not know the words to describe it. Moreover, even if you know the right words in English, you may not find other language resources that may be relevant, such as Chinese documents on the subject topic. Thus, knowledge stays partitioned by language barriers.

The current method of search involves matching digital content to a searcher's entered search terms. Search engines, such as Google, have indexed billions of web sites. These indexes include information gathered from URLs, Hypertext Markup Language (HTML) title information, HTML Meta Tags, image names, accessibility tags, and the content itself of web pages. Meta tags are terms that a webmaster embeds in each document at the head section of the HTML for a given page. There is no standardization for Meta Tags; instead, webmasters make creative (and sometimes manipulative) Meta Tags to gain higher positioning in the search results. This practice (in part) has become known as Search Engine Optimization (SEO). In an effort to balance the result positioning, search engine companies constantly modify their algorithms to counteract false signals. Another approach to get higher positioning is to embed the body of documents with popular search terms, even though the terms may be unrelated to the meaning of the document. In all, webmasters make every effort to get their client's search result position higher, since this will increase the traffic and thus add to the value of the web site.

The World Wide Web Consortium (W3C) for many years has proposed the adoption of semantic tagging to define the subject of web content with a goal of improving the quality/accuracy of search results. These semantic tags are intended to be "machine readable," such as by web crawlers. To accomplish this feat, these semantic tags are expected to conform to the structure of semantic tagging fundamentals. For example, the semantic tags must be located within a structure that "tells" the computer that it is a semantic tag and that it applies to a particular ontology, and then, the tags must appropriately define the meaning of the referenced information.

Efforts towards creating the Semantic Web strive to improve the quality of the results to more closely match the searcher's intention rather than merely matching the searcher's search terms. There are many different approaches being developed today with each having a strong bias towards their own approach as they incorporate an ontology of terms to define the meaning of particular information. This is similar to the meta tags of the current web, referenced above. The main difference is the effort to standardize the terms used to describe the semantic value of the content.

The creators of ontologies will have their own bias or subjectivity and thus will produce an ontology that may, or may not, be universally accepted. As the field expands, there will soon be countless ontologies, making it more difficult to determine which is the best ontology for each domain. Predictably, each ontology will have its own limitations.

Unfortunately, current search tools have several drawbacks that make them unsuitable for some tasks. For example, the search process described above presupposes that the user knows what the user is searching for, or at least some terms included in documents in which the user is interested. Because of this assumption, search tools are not well suited to discovering new information, even within topics the user can identify. For example, a user may be interested in astronomy and may have an easy time searching for discoveries and information already well known to the user, but may have a much harder time finding sources of new discoveries and information. In some cases, a user may not even know the vocabulary that is common to a field, making keyword-based searching practically useless. For example, a user may want to identify information in a language other than the user's native language or in an unfamiliar field of study that uses specialized terminology (e.g., medicine or law).

In addition, current search tools provide a user interface that assumes that text entry is easy and convenient for the user. This is frequently not the case, particularly in mobile applications (e.g., mobile phones) that are becoming a more and more common source through which users access information. Moreover, current search tools are poor at disambiguation of terms. For example, a search for "cranberries" may refer to the fruit, a color of sweater, or the musical group "The Cranberries."

Searches using current methods such as Google and even internal corporate search tools will receive thousands, if not millions of results. Many, if not most of these results are not the least bit related to the searcher's objective. The reason for this is that the current method focuses on the combination of user-typed keystrokes. The fact that these keystrokes are found in a particular document only suggests that there is a match. The frequency of such matches, or the proximity, of these search terms and the document only strengthens the search ranking as an indication that the result might be an appropriate match. However, this approach totally fails to zero in on the true intention of the searcher and the semantic meaning of the searcher's particular intended search effort.

The newest approach for Semantic Search is also failing. First, in order for this approach to work, the webmasters must include the semantic ontology to every document on the web. Second, the ontologies will have to be agreed to universally. Third, most web content is not maintained and the sheer numbers of documents makes this extra effort impossible to implement universally. Therefore, the vast corpus of documents will be out-of-scope for the current semantic search approach. The effort to update billions of pages of information is a daunting obstacle to implementing the current vision for the Semantic Web.

DETAILED DESCRIPTION

Figure 1:
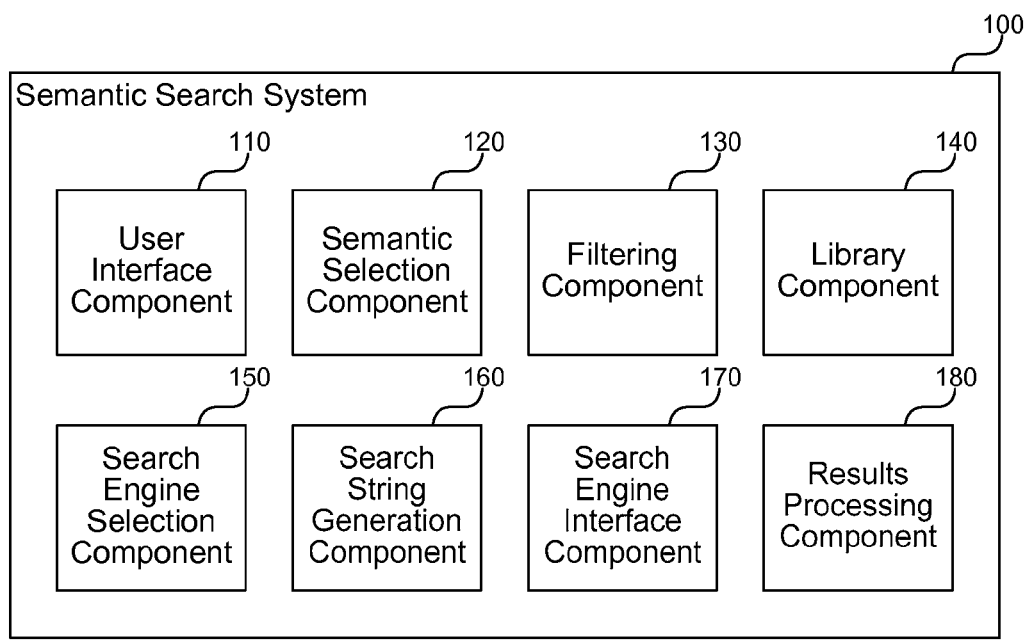
FIG. 1 is a block diagram that illustrates components of the semantic search system, in one embodiment.

A semantic search system is described herein that functions as an input filter in front of most existing search engines and solves the current problems with conventional search as well as the problems with semantic search, described above. The system is an alternative solution to semantic search as currently promoted by the W3C. The system is not dependent upon webmasters incorporating any semantic tags to existing web sites. Instead, this approach empowers the searcher with a tool for constructing simple, yet sophisticated, Boolean search strings in such a way that the search results more closely match the searcher's intent. A searcher, or alternatively a user, is any person who is searching for documents, images, or other medium on the Internet or any place where digital content is stored (e.g., on the Internet or on their home computer). A Boolean search string is a series of terms and commands that instruct search engines in how to utilize the search terms.

The semantic search system described herein constructs Boolean search stings based on input from a user. To begin a search or in advance of a search, the user may adjust one or more settings or preferences. For instance, the user may set a language, geographic location, one or more ontologies, or other settings related to the search. For example, the user may use a touch screen to make selections from a picker wheel or scrolling text list and thereby iteratively select a category, subcategory, topic, and terms. The user may also select one or more target search engines from which to receive search results. For example, the user may select Google or Bing from a drop-down list. From the topic and other information, the system generates a Boolean search string designed to disambiguate a typical search string the user might have generated manually. For example, if the user wants to search for books about dolphins in the ocean (rather than the sports team, hotel, or other content using the same term), the system might guide the user through a selection of categories (e.g., Animals to Water-Based to Dolphin) to determine the user's actual intent, then choose keywords to express the user's intent (e.g., adding the latin family name "delphinidae" for the various species of dolphins). The system then passes the generated Boolean search string to one or more target search engines, receives the search results, and delivers the results to the user. The user selects interesting results from the list (e.g., by clicking links or Uniform Resource Locators (URLs)), and the information is delivered to the user's display.

Thus, the semantic search system provides the user with powerful semantic search capabilities without any modification to existing websites or search engines. The searcher is not assumed to understand Boolean logic to be successful. The system automatically constructs the Boolean string in the background by compiling the searcher's selected elements into a functional Boolean syntax. The completed Boolean string is then passed to the selected search engine and the results are delivered to the searcher. The results received by the user are much more targeted and useful than those produced by the user alone without the system.

The semantic search system described herein provides various elements working together to provide an easy-to-use tool that can be used without typing or vocabulary to explore semantically organized web sites or other information sources. In some embodiments, the system is combined with a user-accessible method for editing, modifying, and submitting categories, subjects, and web sites. The system may also provide a method for creating a custom set of records to satisfy new interests. The system combines content exploration, high quality content, semantically organized records, a natural user interface, user-participation via results editing and the option to have a customizable set of records. Because users search by semantics rather than search terms, the system automatically provides disambiguation so that the user receives on-topic results rather than false positives for other meanings of a particular search term. For example, a user searching for "cranberries" through the system would already have expressed that the current topic is the musical group, "The Cranberries," so that search results would not include hits related to the fruit or other uses of the word.

The semantic search system provides solutions to many problems. For example, mobile phone touch keyboards are difficult to use due to their small size, and the system provides alternative methods of entry to text. The system reduces frustration with poor search results using standard search engines by improving the relevance of search results to the user. The system saves the user time by eliminating time wasted sifting through unrelated content in irrelevant search results. In mobile or other power-constrained applications, wasted time also means wasted battery power. Thus, the system can improve battery life by leading the user more quickly to the information the user wants to consume. The system also can reduce the impact of many annoying sites that have pop-ups and distracting materials. The semantic search system provides many benefits over previous systems, including quality search results, faster access to knowledge, personalized search results, user-added topics, user-published custom sets of records, default record sets (e.g., with a predefined and narrow focus, such as Montessori, Religious, Community, Native American, Kids, Sport, Politics, and Geography). The system also supports users who create sets of web sites.

FIG. 1 is a block diagram that illustrates components of the semantic search system, in one embodiment. The system 100 includes a user interface component 110, a semantic selection component 120, a filtering component 130, a library component 140, a search engine selection component 150, a search string generation component 160, a search engine interface component 170, and a results processing component 180. Each of these components is described in further detail herein.

The user interface component 110 interacts with a search user to receive information describing content that the search user wants to find and to deliver results to the search user. The user interface component 110 may operate through a variety of interfaces to receive information from the user in a manner convenient for the user. For example, the system 100 may provide a touch screen interface, an audio interface, a facial recognition interface, and any other interface from which information related to what the user wants to find can be determined.

In some embodiments, the semantic search system provides a simple touch screen user interface so the system can be used without a keyboard or other text input device. Search today typically assumes the presence of a keyboard or at least a means of entering text (e.g., a virtual keyboard or digital pen). A user enters a text query that the search tool queries against an index to find one or more relevant results. The semantic search system 100 can operate without a keyboard, by displaying one or more word selectors (e.g., a list box or other control) to a user. The word selectors may be used to form a query string or may index into the search index directly.

The semantic selection component 120 receives a selection of one or more categories that semantically refine the content that the search user wants to find, wherein the selected categories identify content without the inherent ambiguities of keywords. The user interface component 110 may provide, for example, two or more picker wheels (or table lists) on a mobile device (e.g., the Apple iPhone) that a user can spin to drill into a structure of hierarchical information similar to the Dewey Decimal System or the Library of Congress organizational system (e.g., stored in the library component 140). Each wheel contains a list of variables or values, the left wheel representing categories and the right wheel representing subjects. For example, "Mammals" may be one category choice on the left and "Dogs" may be a related subject choice on the right. A text box allows the user to enter a specific word/term to tighten the focus such as "Boxer." Alternatively or additionally, an additional series of wheels can be added to increase the degree of refinement.

The filtering component 130 receives zero or more filters from the search user that further refine the content that the search user wants to find. The filter component 130 may receive additional information not necessarily related to the semantic meaning of what the user is looking for but that can help to eliminate or include some types of results in the search. For example, the user may prefer results related to a specific language, geographic location, time period, and so forth. By specifying this information, the system can construct a search query that will further refine and improve the search results that the user receives to match the specified filters.

The library component 140 stores in a data store data that describes one or more categories, filters, and other information used by the system 100. The data store may include one or more files, file systems, hard drives, databases, cloud-based storage services, or other storage devices for storing data. The library component 140 may store one or more ontologies, lexicons, dictionaries, images, user-created values, and other information used by the other components to facilitate the purposes of the system 100. A user can select from a pre-set vocabulary of subjects (e.g., extracted from existing records) to add more precision to the record sets. The user can also submit web sites. For any subject, the user may have a means for contributing sites that the system 100 has not yet indexed. These introduced sites are included in the public database, perhaps only after passing the scrutiny of a filter algorithm for relevance and proper subject association. For example, the system may allow added sites once a threshold number of users add the same site or may have an administrative examination process to evaluate submitted sites for relevance and content suitability. Once passed, these new sites will also be reviewed by users and may be edited out or shifted into a more appropriate subject category or possibly eliminated altogether.

The search engine selection component 150 selects a search engine external to the system to provide a query and from which to receive one or more search results. The system 100 leverages existing search engines by providing a front-end that enables the search user to build better search queries than users typically build on their own. The system may present a list or other user interface control of known search engines or allow the user to provide a search engine (e.g., by entering the URL). For example, the system 100 may provide a configuration option through which the system gives the user a group of buttons to select the user's default search engine. In the application settings, these search engines can be selected for default or removed altogether. The system 100 helps users eliminate ambiguities in search queries by understanding the semantics of what the user is looking for (rising to a level higher than the language used to describe what the user is looking for). The system also reduces the burden of user input (e.g., keystrokes) by identifying the semantics of what the user is searching for with a low amount of input from the user.

The search string generation component 160 generates a search string for delivery to a search engine based on one or more received categories and filters. The search string may include text entered by the user combined with text identified by the system based on automatic analysis of what the user is searching for. For example, if the user typed "red robin" and the system determined that the user is searching for food (e.g., by providing disambiguation categories to the user and receiving a selection), then the system may determine that the user is searching for Red Robin hamburger restaurants and add the words "hamburger restaurant" to a search string for delivery to a search engine.

The search string generation component 160 assembles a series of variables derived from the received categories and filters into a Boolean string for input to the selected search engine. For example, the component 160 may create the string "Search?=Mammals+Dogs+Boxer" after the user has indicated that the user is looking for Boxer dogs. The system passes this Boolean string to a custom search engine or existing systems, such as Google, Microsoft Bing, or Yahoo. For each search engine, the Boolean string conforms to the search engine's parameters for syntax and presentation to match the particular form factor. By building this Boolean string/argument/structure to pass to the search engine, the search engine results will be significantly better than simply typing a single term such as "Boxer." This approach enables the application to leverage the existing search engines and thereby quickly access a fully scalable base of knowledge.

In some embodiments, the system includes a user's previously stored custom database of subjects and terms (e.g., stored by the library component 140). These may be created by allowing users to vote or rank search results. Instead of limiting the search area to the default set of records or the user's custom database of URLs, the user can choose to access various search engines and an immense set of URLs. For example, the system may allow the user to: 1) touch the screen to activate the editorial control, 2) review the records, and 3) touch the screen to click on the vote to increase, decrease, or delete the record. These simple steps make it easy to participate and thereby dramatically increase the likelihood of broad user participation.

Activating the editorial control is accomplished, for example, by touching a selector switch. This toggle switch changes one element of the database query. With the selector switch turned on, editorial links become available to the user. These links provide a pathway to the database embedded with editorial privileges. The scope of these editorial privileges can be limited by other controls. For example, one control can limit the editorial scope based upon the user's subscription status, so that subscribed users receive additional content. Each editorial link is hardwired with a pre-constructed database query variable. This query includes the field names and the variables for new field values. The user/editor does not need any knowledge about database structures or queries to make this work. The user is merely activating an editorial query string.

The search engine interface component 170 communicates with one or more selected search engines to provide the generated search string and receive one or more search results from the search engine for presentation to the user. The component 170 may create query strings, Simple Object Access Protocol (SOAP) requests, or other forms of input expected by available search engines. The component 170 may receive extensible markup language (XML), lists, HTML tables, or other structures of search results back from the search engine in response to queries.

The results processing component 180 manages information gathered from search user interaction with the received search results. For example, the system 100 may store relative relevance of search results based on historical user selection of results in a result list, so that future search results can be sorted or filtered based on the results users have found relevant in the past. Reviewing the search result records can be done by scrolling through a table of records or by spinning a wheel, or a set of wheels (e.g., a "picker" control). One positive aspect of the spinner is that it can be used easily— even on a tiny screen. Spinning the wheel at various rates scans a long list of variables. Only a small portion of the list is visible at any given time.

To trigger the editing of a record, the editor clicks or touches an edit button marked with words such as "Good", "Poor", or "Delete". Alternatively, the buttons may be represented by icons. The user's input may trigger a preset SQL database query such as "UPDATE TABLE animals WHERE animal LIKE 'tiger' SET rank TO '90'". The user choice of button determines a "hardwired query" that changes the value of a field for the selected URL. This new value will in turn change the presentation order for the same given search term for subsequent queries. This simple, easy, and fun user experience increases user participation. Editors may also access the same editorial functionality via a desktop computer.

The computing device on which the semantic search system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
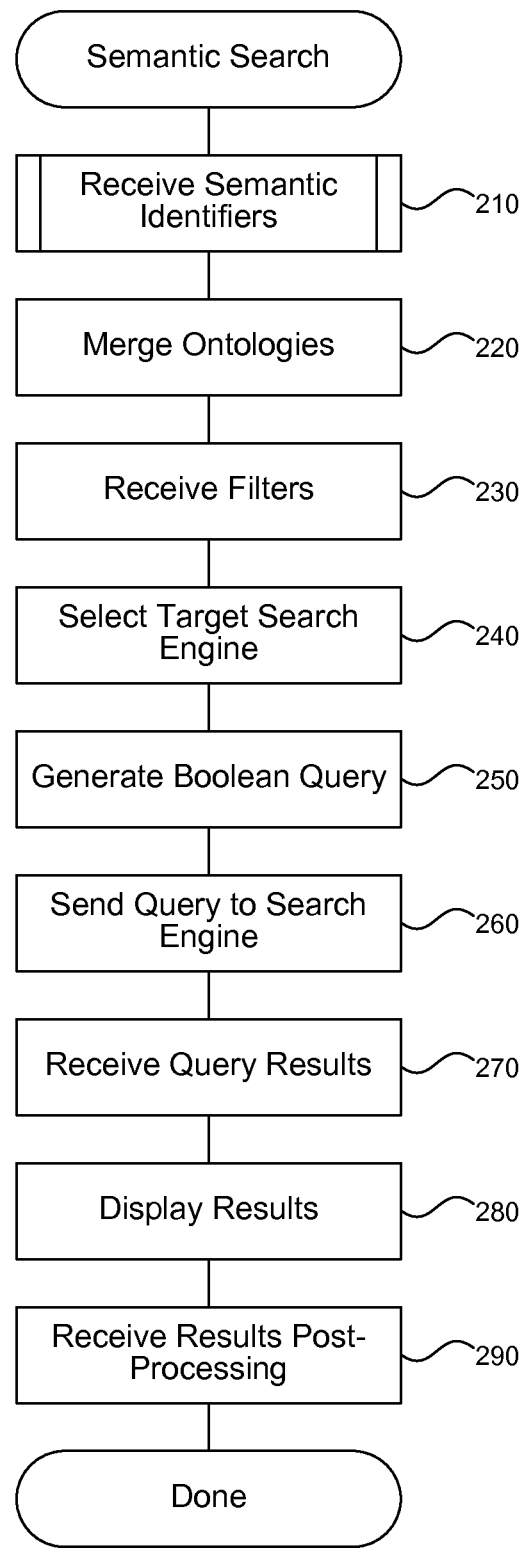
FIG. 2 is a flow diagram that illustrates processing of the semantic search system to perform a semantic search, in one embodiment.

FIG. 2 is a flow diagram that illustrates processing of the semantic search system to perform a semantic search, in one embodiment. Using a computer, such as but not limited to a cell phone, a user can access a set of digitally accessible records that are categorically organized and/or tagged through a user interface of the system. One type of record is a web site. Additionally, records may refer to stored documents such as text, graphics, or spreadsheets. These documents can be stored locally or remotely, so long as a digital path is available to the information.

Beginning in block 210, the system receives one or more semantic identifiers that identify content that avoids at least some ambiguities inherent in keywords. For example, a user may select from a series of categories. The system may also receive a typical keyword-based search query from the user, map the received keywords to possible categories, and receive a selection from the user of categories to be included in the query (e.g., disambiguating the user's entered keywords). The process of receiving semantic identifiers is described further with reference to FIG. 3.

The query process can be accomplished with any number of user interface paradigms such as a spinning picker or moving through a table of records. In a relatively small space, the result set of records can be of the highest quality, drilling down to the topic with any ambiguous terms eliminated. The user only needs a simple interface (e.g., a touch screen) to drill down into the database. In one embodiment of the system, the various stages can be revealed through a series of screens, thus allowing even more levels of refinement, even with a small screen as is found on most smart phones. In one embodiment of the system, the search interface can use a "standard" looking search box that is connected to a drill-down of results. These results are only those that conform to the keystrokes as entered. Thus, with each added keystroke, the remainder of choices is reduced. Even the next available letter selection can be reduced (e.g., from 26 for the English language) based on the previously typed letters.

Continuing in block 220, the system merges one or more ontologies for inclusion in the search. For example, the system may receive the ontologies from previously stored user preferences or directly from the user before the search. Continuing in block 230, the system receives one or more filters that further refine the search. For example, the system may receive any limitations on language, geographic location, time period, or other content restrictions separate from the semantic meaning of the query. Continuing in block 240, the system selects a target search engine to which to deliver the query. For example, the system may receive the search engine from stored user preferences or be preconfigured to use one or more search engines. The system may also receive a search engine selection from the user at search-time (e.g., by offering a button for each available search engine).

Continuing in block 250, the system generates a Boolean query based on the received semantic identifiers and filters. The Boolean query may add additional terms to the terms provided by a user, provide negation terms for eliminating irrelevant results, provide phrases in quotation to find grouped keywords, and so forth. Continuing in block 260, the system sends the generated query to the selected search engine. For example, the system may issue a Hypertext Transfer Protocol (HTTP) request to a web-based search engine, providing the generated query as a query string in the search engine URL. Continuing in block 270, the system receives query results from the search engine. For example, the system may receive an HTTP response that includes query results formatted in HTML or another format.

Continuing in block 280, the system displays the received query results to the user so that the user can select individual results. The query results may include summary text, images, or other information to help the user select individual results for finding content most relevant to the user. Continuing in block 290, the system receives any results post-processing information from the user. For example, the system may automatically track which results the user selects or provide voting or editorial functionality through which a user can comment on and/or rate results. After block 290, these steps conclude.

Figure 3:
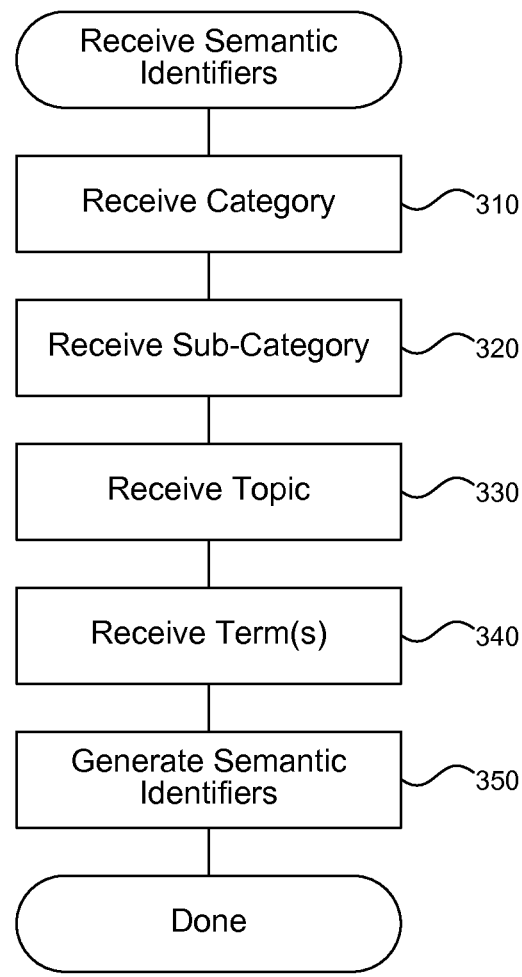
FIG. 3 is a flow diagram that illustrates processing of the semantic search system to receive semantic identifiers, in one embodiment.

FIG. 3 is a flow diagram that illustrates processing of the semantic search system to receive semantic identifiers, in one embodiment. Beginning in block 310, the system receives an initial category. The system may provide a default set of high-level categories (e.g., Places, People, Animals, and so forth) or may provide categories based on information entered by the user, such as an initial set of keywords. In some embodiments, the system presents an initial interface with a series of lists (e.g., picker controls) from which the user can select predefined categories. Continuing in block 320, the system receives a sub-category related to the received category. For example, after the user selects a category the system may retrieve and display available sub-categories from a data store. If the user selects Animals, for example, the sub-categories may include Fish, Mammals, Birds, and so on.

Continuing in block 330, the system receives a topic based on the selected category and sub-category. At each level, the system receives further drill-down information that targets the user's search into a very refined area of interest. Continuing in block 340, the system may receive one or more terms from the user to append to information about the received category, sub-category, and topic. By combining free-form information from the user with well-defined categories, the system disambiguates the user's input terms and produces a search query with results that are more relevant than previous systems.

Continuing in block 350, the system generates one or more semantic identifiers based on the received information. The semantic identifiers may include one or more high-value keywords. High-value keywords are those that are highly likely to identify relevant results, such as a Latin species name of an animal. The semantic identifiers may also use Boolean or other logic to produce a search string that eliminates certain words known to be irrelevant but often confused with a topic (e.g., for the music group The Cardigans a string might include "cardigans not sweater" to indicate that cardigan sweaters are not the topic of the current search). After block 350, these steps conclude.

The semantic search system user input can use dependent selector wheels, also known as "pickers." This feature provides two or more wheels, which are activated by the user sweeping a finger across the touch screen. The right-hand wheel contents are dependent upon the left-hand wheel. In other words, the user first picks a category using the left-hand wheel; this in turn selects the values to be presented in the right-hand wheel. This cascading control allows the user to quickly reach a very refined subject topic in a few simple selections on spinning wheels.

The list of subjects can be organized any number of ways including alphabetically, topically grouped, priority of interest, geographically, numeric value or timeline. There is no limit to the number of subjects for each wheel; however, for a practical matter of user experience, the number of subjects may be limited to, for example, 100 for each wheel. Using just two spinning wheels, this simple structure can support up to 10,000 subjects.

As more steps are added, by using more wheels in a cascade, the drilldown can replicate the complex division of data such as is found in the Linnaean structure, the Dewey Decimal System, or the Library of Congress organization system. One way to accomplish this is to have the results from the first pair of wheels define the starting point for the next set of wheels. Therefore, with two sets of wheel pairs, each having 10,000 options, as many as 100,000,000 subjects can be accessed easily. If each subject had 100 relevant web sites, the sum total of organized web sites could reach 10 billion—far more than any individual could ever realistically use. Interestingly, this would involve only three screens on a mobile device such as the Apple iPhone—two for selection process and one for viewing the results. This illustrates how the front-end of the system can easily be scaled to reach very specific divisions of information. For example, Mammal>Rodent>Mouse>Field Mouse. Just four steps and the user can reach a very precisely focused subject.

Figure 4:
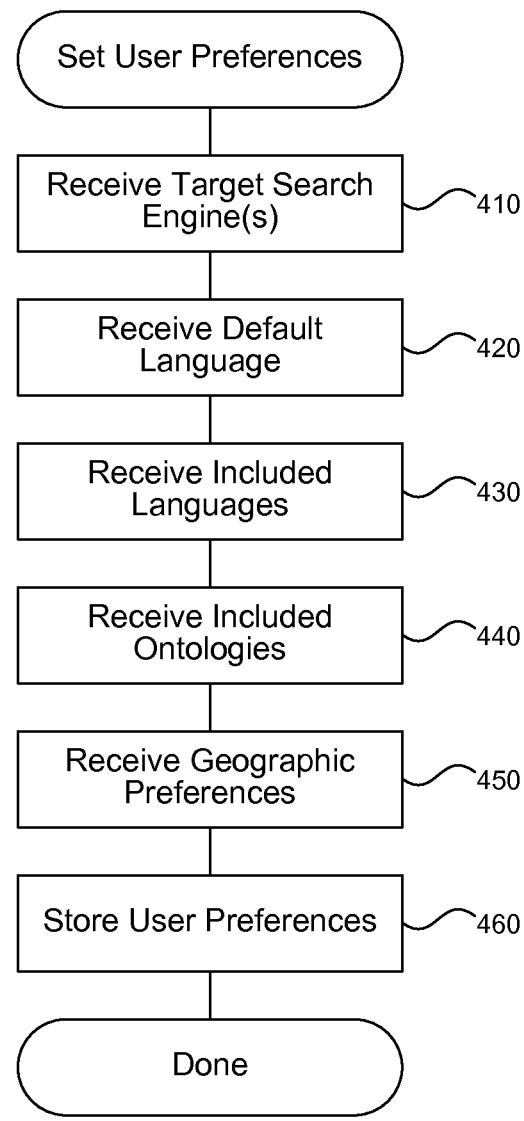
FIG. 4 is a flow diagram that illustrates processing of the semantic search system to set user preferences, in one embodiment.

FIG. 4 is a flow diagram that illustrates processing of the semantic search system to set user preferences, in one embodiment. The searcher may start using the system by adjusting the system settings to meet the searcher's objectives. Beginning in block 410, the system receives one or more target search engines from the user. For example, the user may prefer a particular search engine or may want results from multiple search engines for comparison. Continuing in block 420, the system receives a default language. For example, if the user only speaks English, then the user may not want foreign language search results.

Continuing in block 430, the system receives one or more included languages. For example, if the user speaks multiple languages, then the user may want to receive results in those languages. The system may treat results in the default language as higher ranked than those in other included languages, so that default language results are presented first. Continuing in block 440, the system receives one or more included ontologies for the search. The system may merge multiple ontologies, such as an English, Spanish, and French ontology to produce results from multiple ontologies. The system can prioritize preferences, such as by ranking some preferences above others or merging results from multiple sources.

Continuing in block 450, the system receives geographic preferences. For example, the system may determine whether a geo-location feature that uses the user's current location (e.g., from a global positioning system (GPS) hardware in the user's computing device) to refine search results is activated. The system may also include preferences for results based on geographical information associated with the results, such as where the results are stored, what locations the results pertain to, and so forth. The system may also receive a geographic range or radius within which to include results. Continuing in block 460, the system stores the received user preferences for use in subsequent searches. For example, the system may store the preferences in a database in a user profile associated with the user. After block 460, these steps conclude.

For further illustration, the searcher may choose a preferences menu from a starting point of a user interface provided by the system and choose the following items: English as the default language, the ontology of mammals, the current geolocation is "on," and the searcher selects the search engines: Google, Yahoo, and the American Kennel Club. Next, the searcher may begin a search by selecting a category of "canine," and a subcategory of "dogs," and the term "boxer" from a resulting list. In the background, the system assembles all of these selections, generates a search string, passes the completed Boolean string to the right URL address for the selected search engine, and delivers the results to the searcher's screen.

Wiki Participation

In some embodiments, user participation further increases the quality of the results provided by the semantic search system. Users are empowered to participate in lifting the quality of the database to the next level. Users are encouraged to flag, tag, and edit the results for each topic and thereby further refine the quality of the records to a tighter standard of semantic relevance. In this way, the system combines Wiki and search.

In each instance, there is a ranking value for each subject and each record. The user who triggers a database query to change the value of the ranking modifies this ranking value. The immediate result is that the records will then have a new position in the presentation window. In the case of a user deleting records, the system replaces the original ranking value with a new value that will prohibit that record from being included in the new record set.

In some embodiments, the user may use a copy-and-paste feature of a mobile device (e.g., the Apple iPhone in OS 3.0) to enter new sites without a keyboard. The system provides a user input form to easily submit a new web site record along with its description and Universal Resource Location (URL). The new record will be added to the body of records if it passes applicable quality control filters.

Records can be server-based or local to the device. The system connects with a front-end page that is located on a server. Alternatively, this aspect may be locally stored on the mobile device to reduce the access time. While local storage can take up considerable space on a mobile device, local storage also increases performance by reducing latency and bandwidth used. The user will have the option to select a storage method and may change the method at any time.

The user can select the number of records to show with a sliding scale. This will allow the user a full range of experiences. By reducing the number of records to show, the load time can thereby be reduced. The shorter time saves battery use and improves the user experience. This same functionality can be applied as a method to reduce the database size when stored locally. For example, the user may select to limit the number of locally stored records for each topic. If the user later wants to see more records, the user will be able to access the additional records from the server.

In some embodiments, the system allows the user to rank records. In the user interface, a simple button/switch offers the user the ability to turn the ranking feature on or off. The ranking feature allows the user to vote or modify the order or sequence of results. GOOD sites will climb higher in their position while POOR sites will drop lower and BAD sites will be removed altogether. The net effect is that the search results will get incrementally better with each new vote. With long-term input from thousands of contributors, the results will be distilled to the finest order.

In some embodiments, there are two fields for ranking, one for the individual user and a second for the aggregated userbase. Each time a user modifies the ranking of one record, that value also will change the value of the aggregated ranking value.

Add/Delete Categories and Subjects

In some embodiments, the semantic search system allows registered editors to customize categories, subjects, and results. These editors can activate the editorial function with a simple switch. When the switch is activated, the editor has the ability to add, delete, or rearrange categories, subjects, and records. The editorial function can be driven by touch without typing, with the possible exception of adding categories or web sites.

For each topic in the database, all the words from the associated records are parsed to form a list of potential subject headings. This collection of words is then reduced and refined. First, all of the duplicates are eliminated. Next, words such as "but", "and", "for", "is", "there", and so forth are removed. Finally, words that have too many meanings such as "set" and "case" are removed. The final distilled set of records then is presented alphabetically. The editor can scroll through this set and select words that the editor wants to define as subjects. The editor can also add new subjects via a standard data entry form. As the editor types letters, a dropdown menu of words (drawn from the list mentioned above) becomes tighter. Extensive vocabulary can be revealed as the editor types letters. The system may also make this topical/vocabulary database table available for further detailed Wiki editing by users.

Custom Set of Subjects and Records

Because this approach to search is driven by a database of semantically organized records, it is well suited to support customizable searching. In some embodiments, the semantic search system provides each user with a personal (private) custom table of records. This way, the user's efforts are self-serving. Over time, the user creates a well-tailored set of subjects and associated records.

A dedicated table of records can be established for one client/user. Once users have registered for the custom features, they will have a database allocated to their own custom refinement. Their databases will be accessible only to them (unless they choose to share or publish their record sets). This way, users will be able to customize their own experience and remove subjects that will rarely be used and add subjects that are not part of the default set. By doing so, users have refined and improved their personal search experiences.

In some embodiments, the custom set of records in the database is a view of URLs. There is no need to replicate the table of URLs. The user is given a set of URL IDs that are used to access the URLs. This efficiency, by not replicating the core database, dramatically saves data storage costs while giving each user a custom set of controlled data views. This custom set of user records is relatively small by today's database standards. Even the custom images used in the drilldown will be small since the image file size will be constrained to thumbnail size. A default supply of images is available as a standard starting point. As users upload thumbnails, these images will be available to all users. The ID value for each thumbnail is the only record that the custom tables need to store. From this ID number, the user has access to the stored images.

When a user wants to modify the default image for a given subject, the user is provided with a scrollable selection of images matching that subject. There is also an option to access a form for uploading new images. These new images may be stored in a main image folder with the associated tags and will be referenced in the database. The custom database has a field with a trigger for "custom image". In this field, an image ID is stored that the system uses to access the custom image. If there is no reference in the custom image field, the system uses a master default image. When multiple images are available for a given subject, the default selection may be set as random, so the user will have a more fluid visual experience. This feature may be turned on or off in the user preferences.

New users are given a large set of generic default categories and subjects (a jumpstart set) that they can modify. Alternatively, or additionally, the user may choose to start with an empty structure having no categories, subjects, or records. Over time, this starter-set will progressively mirror the average user. To create this average user set of subjects, a query is continuously run of all of the custom record sets to define what categories and subjects are most popular. Each record in the database has a field representing the popularity for that record. With this selection process, the most popular records are selected for the default set of records. Additionally, new users are able to define how many popular categories they want for their beginning set of records.

In some embodiments, the custom database is created by running a set of query instructions starting with a substantially unique ID for each new user. The user then supplies Name, City, and payment subscription terms. Then the user selects from list of default categories and topics and defines a number of records to show. The user hits a "commit" button and the system builds the user's custom database and provides the user his/her login information via automated email.

A user with a custom database can add categories and subjects. As mentioned above, the user can add words by typing (or copy and paste). In this mode, the user also can add a new subject term that has not been found in the existing set of records. The database naturally will not have any records to match this new term so the user may need to enter records to satisfy this new subject.

User input increases the value of the user's custom record set, balancing the user's effort with the user's rewards. With each editorial vote and with each new contribution of records, the custom set gains value, both in the quality of records and the scope of subjects. A frequent query of the database will harvest all of the popular categories, subjects, and records from all of the users and then aggregate this valuable user input into the most comprehensive set of popular records. The current set of records is extensive but, with more participation in the URL editing and submissions, the users will make the main data set even more comprehensive.

The touch screen interface makes it simple and easy to effectively participate with even the small screen of a mobile device. Just a minor effort from thousands of people will build a very refined set of records. Because the editorial inputs take effect quickly, there is no need to wait for management to accept the editorial perspective and contribution of new records. The same set of records also will be available to anyone by logging into the database via Internet, using a more conventional method for drilldown. For some users, such a conventional access will offer a better way to edit, modify, and contribute.

In some embodiments, custom database fields include: Language, Categories, Subjects, URL IDs, URL ranking, Category Custom Image ID, Subject Custom Image ID, URL Custom Image ID, User Status, User Preferences, and User Voting Record.

As a starting point, the user is supplied with a narrow set of categories. A vocabulary of additional categories is available for immediate expansion. This set of extra categories can be reviewed and selected with a simple touch or tap on the subject for inclusion. Later, as the user wishes, those categories can be eliminated. This way, the set of categories is very malleable and thereby "living" with the user. User interests likely will change over time and this enables users to keep the options closely focused to match their current interests. The additional subject list is available through the user options.

Variations

In some embodiments, the semantic search system provides a random result feature. Random spinning of the wheel (using a "Random" button or a "Shake" trigger—either a button or the accelerometer) will result in accessing unexpected areas of knowledge to explore, or stumble upon as a new form of "edutainment." The system may automatically select categories, sub-categories, and topics and issue a search query to the search engine.

In some embodiments, for each category and topic, the semantic search system provides an image from a library that is topically representational to represent the subject instead of, or in conjunction with category descriptive terms. These images help overcome difficulties and/or limitations of vocabulary, language reading, and general knowledge. Images combined with a touch screen help make the system more universal, transcending cultural barriers, language constraints, and many other limitations. Images can be more quickly understood than reading and interpreting words (especially when there are ambiguities).

In some embodiments, the semantic search system allows the user to select and/or limit the number of records (scope) presented 560. For example, there may be thousands of qualified records but there is little point in seeing more than 10 or 20. Typically, the user will not look any further than a few records, especially if the quality of the records is high. The control for this records-to-show value can be either a slider or just a number entered into a field. By limiting the number of records presented, the speed-to-load is increased and the bandwidth used is reduced. The drilldown-to-data can be as simple as one wheel or as complicated as a multiple of wheels and/or a multiple of tables.

In some embodiments, the semantic search system includes a database of filtered records. The database of web site Universal Resource Locators (URLs) has been thoroughly scrubbed to remove unrelated web sites and the remaining web sites have been organized based on their subject matter. Using one or more knowledge-based algorithms, the records are selected by an operator of the system based upon relevance related to a wide variety of subjects. The algorithm assigns each record to a particularly tightly focused subject based upon the semantic value of the web site. This effort of cleaning and organizing dramatically increases the value of the database, which otherwise would be a flat database, that is a database lacking any architecture or organization. The filtering of sites also eliminates sites containing irrelevant information, such as parked search pages, spam, potentially offensive content, and so forth.

In some embodiments, the semantic search system provides a category of sites that are mobile ready. One section of the database will host links to web pages that are pre-formatted to be compatible with mobile phones or other devices. This selection of sites will be very useful and popular with mobile phone users.

In some embodiments, the semantic search system allows a user to start with an empty set of records, categories, and subjects. One option available to the user is to have a clean slate of the database structure with no content or categories. While this may not appeal to very many people, it will appeal to a few. This blank slate will allow the user to build a completely custom array of records. The user can select language, add categories, add subcategories, add subjects, upload images for each subject, and add records under each subject. For some specialty categories, such as astrophysics, this could prove invaluable.

In some embodiments, the semantic system allows a user's dedicated set of records to be shared locally or published for other users to use. A user who is a professional in any subject might want to build a custom set of records that would be particularly popular among other users who share similar interests. Such a set of records could fetch a "publishing fee" for this narrow audience. For example, someone might be keen on dogs and they could build an impressive set of records related to dogs. Other dog lovers would be thrilled to have such a set of records to begin their own customized records. These private sets can be offered for sale using the system.

The published set of records can be restricted to invitation only or based on paid subscriptions. Users who have developed a high-quality set of records can publish this set to a main support web site. The user can publish and share their result sets. Other users can purchase this set from the web site using the "paid in" feature. In some embodiments, the operator of the semantic search system may take a percentage management fee for all such transactions.

In some embodiments, the semantic search system creates an aggregate of user participation to benefit all users, directly or indirectly. The editing of the database by multiple users is aggregated to improve the default collection of records. In addition, as users submit web sites, they are filtered and assigned to the appropriate section of the database. While only a small percentage of users may take advantage of this Wiki opportunity, this small group of users can add immense value for all users.

All of the above items can be replicated for other languages. The user can select a language from a complete list of languages. In some embodiments, when a user enters words, a translation dictionary kicks in to find matches in English or another language. The English term is then used to populate the set of records for that particular subject. Over time, the users can replace English sites with sites in their own language.

The ability to add categories, subjects, and web sites lends itself well as a platform to collect and preserve languages. One who is proficient in a dying language can create a new table column for their language. Over time, they can add their words to the database. This database can be accessed by a mobile device or by any web browser.

In some embodiments, the semantic search system provides localization options. Localization can be accomplished by allowing users and editors to: select appropriate topically matched content, select languages, submit web content that is at least relevant to the locality, and submit images that more closely reflect local views. For example, a remote island in the South Pacific might have many subjects that are of particular interest such as volcanoes, hurricane, tropical fish, tropical birds, alternative energy, and more. The local users can all participate as they find interesting sites in their normal Google searches. They can add these to the local community custom set of records, using their own language.

In some embodiments, the semantic search system allows users to share records sets via Bluetooth and other communication methods. Using Bluetooth peer-to-peer, a user can share a custom set of records with another user. This transfer of custom record sets can be restricted, for example, to current subscribers. By enabling Bluetooth transfer of record sets, demand on the servers to download records can be reduced.

From the foregoing, it will be appreciated that specific embodiments of the semantic search system have been described herein for purposes of illustration, but that various modifications may be made without deviating from the spirit and scope of the invention. Accordingly, the invention is not limited except as by the appended claims.

I claim:

1. A computer-implemented method for performing a semantic search, the method comprising:
   receiving one or more semantic identifiers that identify content that avoids one or more ambiguities inherent in keywords;
   merging one or more ontologies for inclusion in the search;
   receiving one or more filters that further refine the search;
   selecting a target search engine to which to deliver the query;
   generating a Boolean query based on the received semantic identifiers and filters;
   sending the generated query to the selected search engine;
   receiving query results from the search engine; and
   displaying the received query results to the user so that the user can select individual results,
   wherein the preceding steps are performed by at least one processor.

2. The method of claim 1 wherein receiving one or more semantic identifiers comprises displaying a list of multi-level categories to a user and receiving the user's selection from a category at one or more levels.

3. The method of claim 1 wherein receiving one or more semantic identifiers comprises receiving keywords from the user, mapping the received keywords to possible categories, and receiving a selection from the user of one or more mapped categories to be included in the query, wherein the categories disambiguate the user's entered keywords.

4. The method of claim 1 wherein receiving one or more semantic identifiers comprises receiving a user selection from a displayed user interface accessible from a touchscreen attached to a computing device.

5. The method of claim 1 wherein receiving one or more semantic identifiers comprises receiving a user selection from audio input data mapped to one or more categories.

6. The method of claim 1 wherein receiving one or more filters comprises receiving at least one filter related to a user selected language for search results.

7. The method of claim 1 wherein receiving one or more filters comprises receiving at least one filter related to a user selected geographic region for search results.

8. The method of claim 1 wherein selecting a target search engine comprises receiving from the user a Uniform Resource Locator (URL) of a search engine external to a computer system performing the method.

9. The method of claim 1 wherein generating the Boolean query comprises adding additional terms to terms provided by a user and placing the terms in a query string appended to a search engine URL.

10. The method of claim 1 further comprising, after displaying the received query results, receiving user input related to the quality of results received and storing information about the user input to refine subsequent query results.

11. A computer system for improving search results from a search engine, the system comprising:
- a processor and memory configured to execute software instructions embodied in the following software components;
- a user interface component configured to interact with a search user to receive information describing content that the search user wants to find and to deliver results to the search user;
- a semantic selection component configured to receive a selection of one or more categories that semantically refine the content that the search user wants to find, wherein the selected categories identify content without one or more inherent ambiguities of keywords;
- a filtering component configured to receive zero or more filters from the search user that further refine the content that the search user wants to find;
- a library component configured to store in a data store data that describes one or more categories, filters, and other information used by the system;
- a search engine selection component configured to select a search engine external to the system to which to provide a query and from which to receive one or more search results;
- a search string generation component configured to generate a search string for delivery to a search engine based on one or more received categories and filters;
- a search engine interface component configured to communicate with one or more selected search engines to provide the generated search string and receive one or more search results from the search engine for presentation to the user; and
- a results processing component configured to manage information gathered from search user interaction with the received search results.

12. The system of claim 11 wherein the user interface component is further configured to provide a non-keyboard input method including a touchscreen or audio input interface.

13. The system of claim 11 wherein the semantic selection component is further configured to identify one or more topic areas from which the user wants to receive search results.

14. The system of claim 11 wherein the filtering component is further configured to receive additional information not related to the semantic meaning of what the user is looking for but that can help to eliminate or include one or more results in the search.

15. The system of claim 11 wherein the search engine selection component leverages one or more existing search engines by providing a front-end that refines search queries provided by the user by adding additional search terms that eliminate at least some unwanted results.

16. The system of claim 11 wherein the search string generation component is further configured to include text entered by the user combined with text identified by the system based on automatic analysis of results for which the user is searching.

17. The system of claim 11 wherein the search string generation component is further configured to assemble a series of variables derived from the received categories and filters into a Boolean string for input to the selected search engine.

18. The system of claim 11 wherein the search string generation component is further configured to incorporate information from previously provided editorial evaluation of past search results.

19. The system of claim 11 wherein the results processing component is further configured to provide an editorial control through which the search user can indicate relative relevance of search results so that future search results can be sorted or filtered based on the results users have found relevant in the past.

20. A computer-readable storage medium comprising instructions for controlling a computer system to storing user preferences related to search results, wherein the instructions, upon execution, cause a processor to perform actions comprising:
- receiving one or more target search engines from the user;
- receiving a default language in which to provide search results;
- receiving one or more additional languages in which to include search results, wherein the system treats results in the default language as higher ranked than search results in additional languages;
- receiving one or more ontologies to include in a search;
- receiving one or more geographic preferences to apply to search results; and
- storing the received user preferences for use in subsequent searches.

* * * * *